(12) United States Patent
Farrell

(10) Patent No.: US 7,596,244 B2
(45) Date of Patent: Sep. 29, 2009

(54) AUTOMATED PROOFING FOR DIGITAL PRESSES

(75) Inventor: Michael E. Farrell, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 973 days.

(21) Appl. No.: 11/142,099

(22) Filed: Jun. 1, 2005

(65) Prior Publication Data

US 2006/0274354 A1 Dec. 7, 2006

(51) Int. Cl.
*G06K 9/00* (2006.01)
(52) U.S. Cl. .................................. 382/112; 358/1.12
(58) Field of Classification Search .............. 382/112; 358/1.1–1.9, 1.11–1.15
See application file for complete search history.

(56) References Cited

U.S. PATENT DOCUMENTS 5,436,730 A 7/1995 Hube .......................... 358/401
6,279,042 B1 8/2001 Ouchi ......................... 709/240
6,429,947 B1 * 8/2002 Laverty et al. ............. 358/1.15
6,469,805 B1 10/2002 Behlok ....................... 358/1.9
6,498,610 B1 12/2002 Glaspy, Jr. ................... 345/603
6,526,240 B1 2/2003 Thomas et al. ............... 399/72
2002/0131070 A1 * 9/2002 Housel et al. .............. 358/1.15

* cited by examiner

*Primary Examiner*—Wesley Tucker
(74) *Attorney, Agent, or Firm*—Alix, Yale & Ristas, LLP

(57) ABSTRACT

A method of automatic proofing a document submitted for printing on a press having a digital front end includes inputting the document into a raster image processor to produce a post-RIP file. A copy of the post-RIP file is saved as a proofing file in a proofing file storage location and notification is transmitted electronically to each approver that the proofing file is available for review. The computer system monitors the proof decision status of the proofing file. If the proof decision status indicates that the proofing file is approved, the computer system automatically releases the post-RIP file to print.

23 Claims, 4 Drawing Sheets

| JOB ID | PROOF DESTINATION | NAME | LOCATION | PHONE | EMAIL | SPECIAL INSTRUCTIONS | DUE DATE | PROOF DECISION |
|---|---|---|---|---|---|---|---|---|
| JOB-01 | REMOTE | JOHN SMITH | BLDG 066-34B | 34600 | JSMITH@XYZ.COM | | 06/17/05 | APPROVED W/ COMMENTS |
| | | | | | | | | |
| | | | | | | | | |
| | | | | | | | | |

FIG. 3

AUTOMATED PROOFING FOR DIGITAL PRESSES

BACKGROUND

This embodiment relates generally to a technique for proofing color printed material. More particularly, the present embodiment relates to a technique for remote proofing color printed material.

Users of printing systems for producing color printed material need to predict the color and imaging behavior of the printer prior to printing the job. Typically, this has been accomplished by producing a proof print that represents the expected output of the production device. The printed copy of the stored print job provides a user of the printing system the opportunity to verify, among other things, that the job is assembled properly, image quality is acceptable and finishing is specified properly. However, such "on-press proofing" requires the displacement of other, billable, work on the press.

In addition, certain publishing environments require a complex proofing process. Such a process can involve sending a proof job by, for instance, mail to multiple recipients who, most likely, are disposed remotely of the print shop, and then waiting for each of the recipients to respond with approval or rejection of their proof. This type of proofing process has at least two significant implications relative to the print shop. First, the print shop will, most likely, have to wait a significant amount of time for recipients to receive, review and respond to the proof (e.g. days or even weeks). During this time, the print shop must retain the job on the printer and move on to other work, i.e. the storing and processing of other jobs. Second, due to the first implication, and the multiplicity of the recipients, the print shop is obligated to track, status and manage a significant number of outstanding proofs (and other associated jobs) at any particular time.

Currently, the means that a print shop typically uses to track, status and manage outstanding proofs may range from the informal, such as maintaining a written or unwritten record, to the formal, such as maintaining a record on a computer. In either circumstance a significant amount of human intervention is required through such processes as receiving telephone communications, taking notes and/or inputting information to a computer. During such processes, the chance of encountering error or delay is highly probable. For example, delay may occur when an appropriate print shop operator is not available to take a call and up date information. In the end there can be considerable cost associated with supporting such a system and additional costs can be incurred when productivity and customer satisfaction are reduced as a result of errors and delay.

More recently, monitor based proofing systems have become available that provide remote approval management capabilities such as e-mail notification to persons having proof approval rights along with the ability to remotely approve or reject the proof. Examples of remote monitor based proofing systems include Integrated Color Solutions' Remote Director™ and Kodak Polychrome Graphics' Real-TimeProof™. However, the functionality of the monitor based proofing systems is limited.

SUMMARY

There is provided a method of automatic proofing a document submitted for printing on a press operatively coupled to a digital front end. The method comprises a computer system of the digital front end inputting the document into a raster image processor to produce a post-RIP file. A copy of the post-RIP file is saved as a proofing file in a proofing file storage location. A notification is transmitted electronically to each approver that the proofing file is available for review. The computer system monitors the proof decision status of the proofing file, the proof decision status providing an indication of the response of each approver. If the proof decision status indicates that the proofing file is approved, the computer system automatically releases the post-RIP file to print.

The computer system of the digital front end also opens a print job database and creates at least one document record associated with the document within the database. The computer system then queries for approver information and saves the approver information in the document record. The computer system of the digital front end further queries for a proof file destination and saves the proof file destination in the document record.

The computer system of the digital front end also determines whether the post-RIP file is suitable as a proofing file format. If the post-RIP file has a suitable format, the post-RIP file is saved in the proofing file storage location. If not, a copy of the post-RIP file is created in a remote proofing file format and saves the copy in the proofing file storage location.

The approver accesses the proofing file with an approver computer system and transmits a proof decision electronically to the computer system of the digital front end. The computer system of the digital front end saves the proof decision in a proof decision status field of the document record associated with the approver. The computer system of the digital front end periodically queries the proof decision status file associated with each approver of the document. If the proof decision status field associated with each approver of the document indicates that the approver has approved the document, the post-RIP file is released to print. If the proof decision status field associated with each approver of the document does not indicate that the approver has approved the document, a local policy section of the database is queried to determine the action required.

If the local policy requires that all documents that are not unconditionally approved by each approver be deleted, the computer system of the digital front end deletes the proofing file and post-RIP file if the proof decision status field associated with each approver of the document does not indicate that the approver has approved the document. If the local policy requires that all documents that are not unconditionally approved by each approver be retained, the computer system of the digital front end retains the proofing file and post-RIP file for a predetermined period of time if the proof decision status field associated with each approver of the document does not indicate that the approver has approved the document.

If the proof decision status field associated with at least one approver of the document does not contain the proof decision and is empty, the computer system of the digital front end may query a timer periodically. If the timer exceeds a predetermined time period, an approval is saved in each empty proof decision status field. The post-RIP file is then released to print if the proof decision status field associated with each approver of the document indicates that the document has been approved. The proofing file and post-RIP file are deleted if the proof decision status field associated with each approver of the document does not indicate that the document has been approved and the local policy requires that all documents that are not unconditionally approved be deleted. Alternatively, the proofing file and post-RIP file are retained for a predetermined period of time if the proof decision status field associated with each approver of the document does not indicate that the document has been approved and the local policy requires that all documents that are not unconditionally approved be retained.

The computer system of the digital front end prompts the originator of the document to determine whether the document can be modified and resubmitted if the proof decision status field associated with at least one approver of the document contains a conditional approval or a conditional disapproval and no proof decision status field associated with any approver of the document contains an unconditional disapproval.

BRIEF DESCRIPTION OF THE DRAWINGS

The present embodiment may be better understood and its numerous objects and advantages will become apparent to those skilled in the art by reference to the accompanying drawings in which:

FIG. 3 is a schematic representation of a database stored in a memory section of the printer system.

DETAILED DESCRIPTION OF THE PREFERRED EMBODIMENT

Although the advent of digital presses has provided greater flexibility and functionality to the printing process, digital presses of the type disclosed in U.S. Pat. No. 6,469,805 to Behlok, issued Oct. 22, 2002, and U.S. Pat. No. 6,526,240 to Thomas et al, issued Feb. 25, 2003 (hereby incorporated by reference) still require proofing of the printed material to predict the color and imaging behavior of the printer prior to printing the job.

Figure 1:
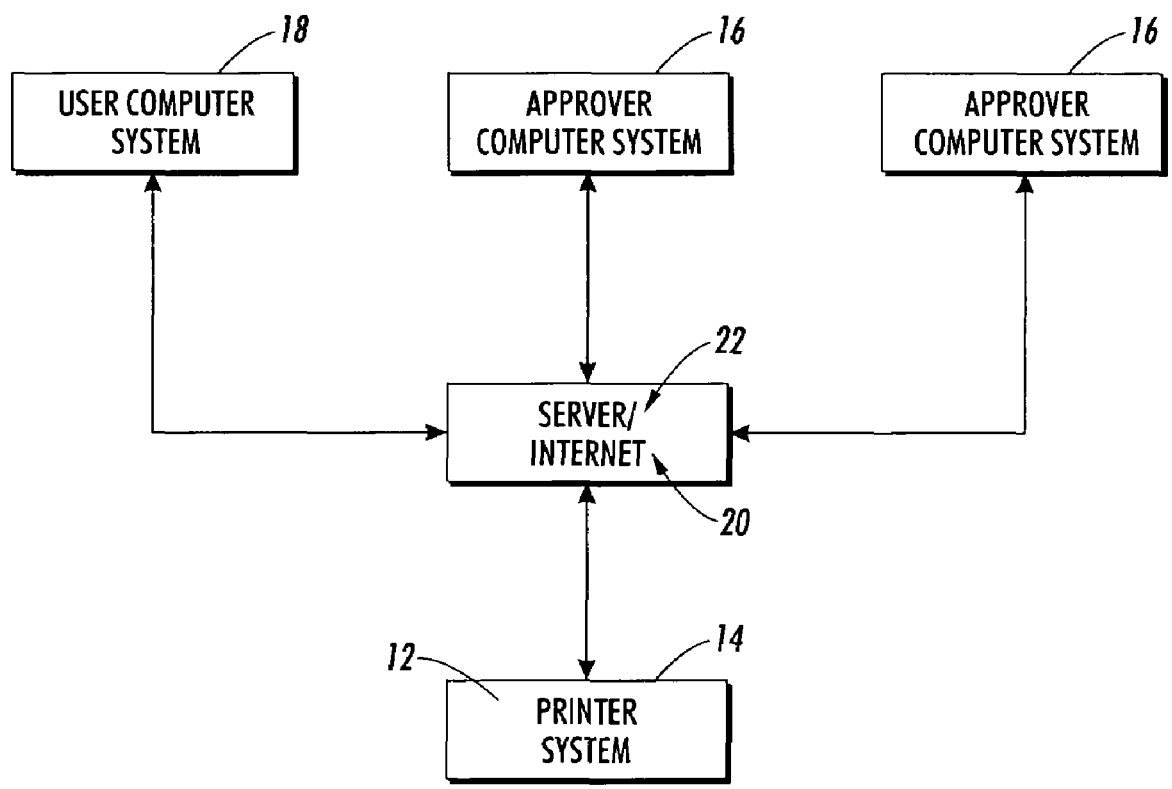
FIG. 1 is a schematic diagram of a digital printer system utilizing a method of automatic proofing, showing the printer system connected to user and approver computer systems via a local area network or the Internet.
Figure 2:
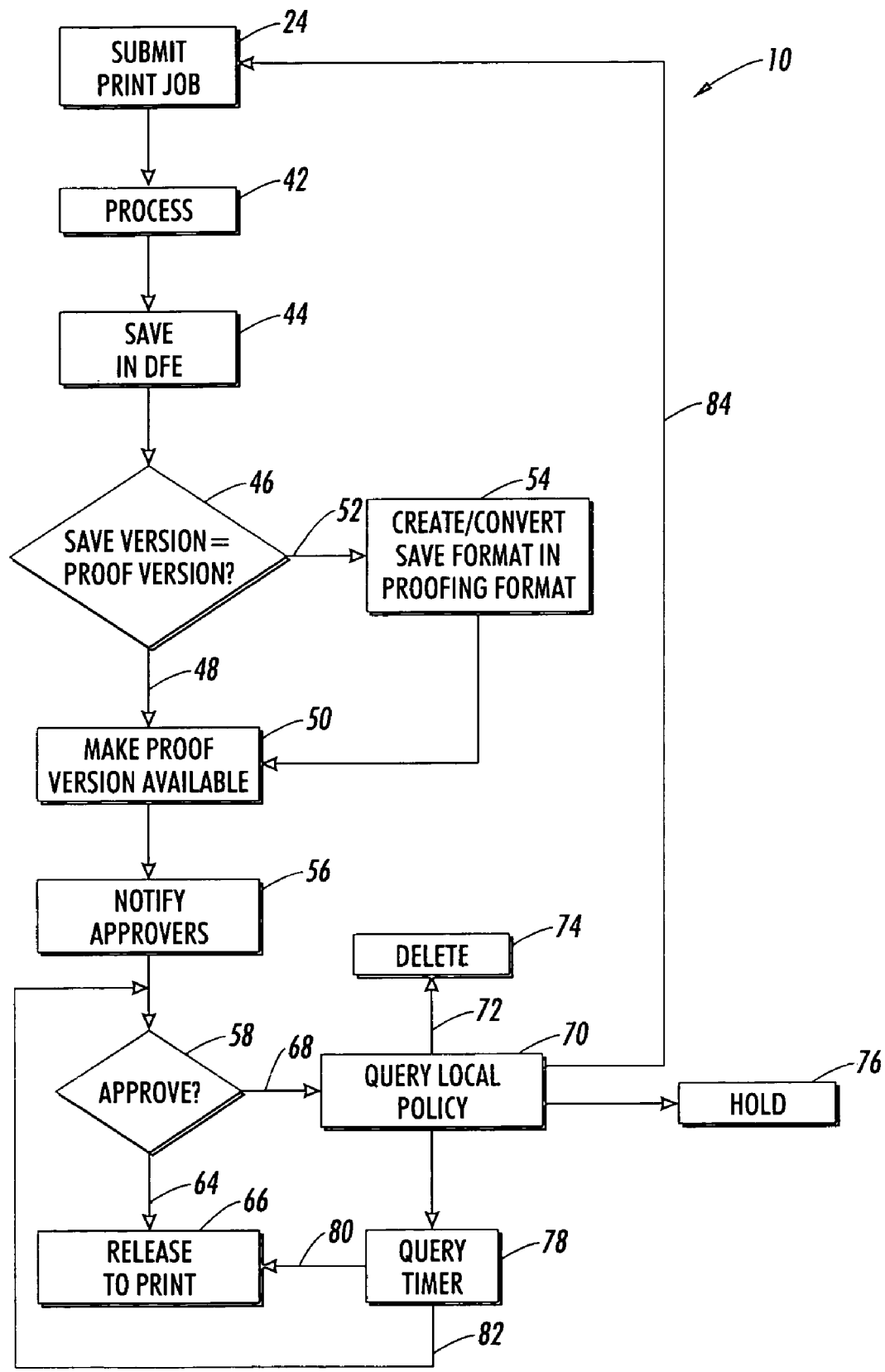
FIG. 2 is a flow diagram of a method for automatic proofing.
Figure 4:
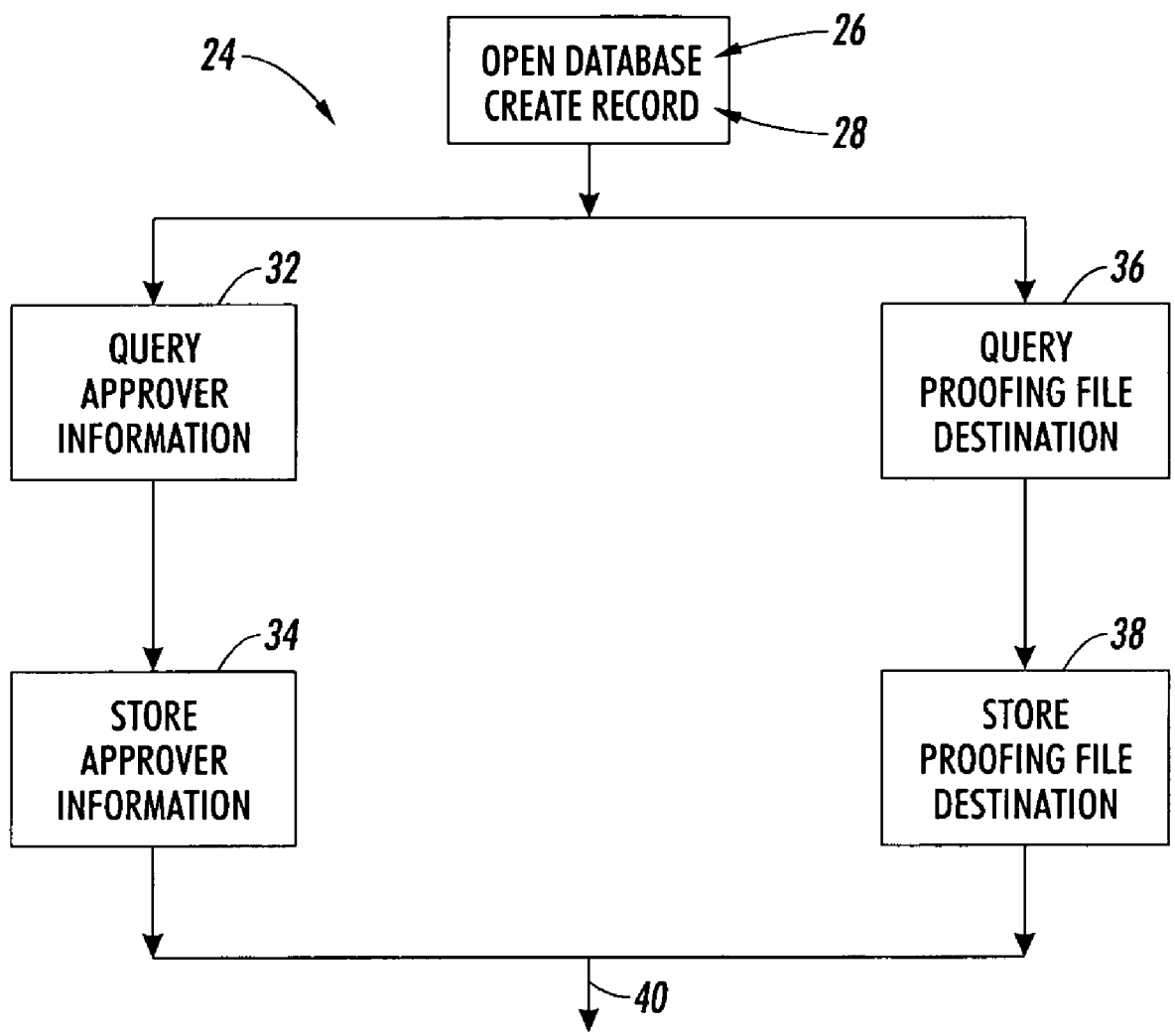
FIG. 4 is a flow diagram of the submit routine of the method for automatic proofing.

With reference to the drawings wherein like numerals represent like parts throughout the several figures, a method of automatic proofing for digital presses 10 works in conjunction with systems that allow direct communication between the computer 12 of the digital press 14 and the computers 16 of the persons having approval rights for proofing (hereinafter "the approvers"). Each user/originator computer system 18 and approver computer system 16 will generally comprise standard components including a computer, a keyboard, a display and a mouse (none of which are shown). With reference to FIG. 1, the digital press computer 12 may be connected to the approver's computer system 16 via the Internet 20 or a local area network (LAN) 22. The digital press 14 may similarly be connected to the computer 18 of a user/print buyer.

As described in U.S. Pat. No. 6,469,805, a document creator typically runs a composition program to create the digital document which contains objects such as color images, graphics and/or text. The document creator may use scanned images, computer programs, or other generation means to create the digital document. Typically, such generation means generates three component color spaces, i.e., red, green, blue (RGB) to represent the objects, however, the generation means may also generate other combinations of colorants such as cyan, magenta, yellow and black (CMYK). It should be appreciated, that depending on the work environment, the document creator may be a print buyer submitting the created document via the Internet, a local user submitting the created document to a remote printer system via a LAN, or a printer preparing the document to specification. The digital document is displayed on the monitor of the computer as an array of grey scale pixel values (ranging from 0 to 255) representing the intensity of each of the plurality the colors at each pixel location. As such, this document is known as a continuous tone or contone image. The composition program and a print driver converts the contone image into a page description language (PDL) file including contone data (for images), text data, and graphic data.

The subject method of automatic proofing for digital presses 10 commences after the document has been created, when the document is submitted for printing 24. The document/print job may be submitted in a print job ticket format, for example Xerox Print Instruction Format, CIP4's Job Description Format (JDF), or similar formats. Alternatively, the print job may be submitted in Internet Print Protocol. Print job attributes may be specified by any conventional print job programming accelerator technique, such as queue defaults or overrides.

The submit print job routine 24 stores persistent job status information in a manner that allows access to such information as the print job is processed. One method of storing such data is with a print job database of the type described in U.S. Pat. No. 5,436,730 to Hube, issued Jul. 25, 1995 (hereby incorporated by reference). In this case, the submit print job routine 24 opens a print job database 26 and creates at least one new record 28 within the database 26 for the print job. The records of the subject print job database require much of the same information as that of U.S. Pat. No. 5,436,730, including the identity of each approver. However, as shown in FIG. 3, the subject database 26 also requires address information 30 for each approver for electronic delivery of the proof document. Typically, the approver address information 30 required would be e-mail information/protocols for contacting each of the approvers. The submit print job routine 24 queries 32 the job submission mechanism to provide a listing of all approvers, to provide the approver information for each of the identified approvers, and then records 34 the information submitted by the document creator. The submit print job routine also queries 36 for the proof file destination. The destination may be a file storage location in the printer system memory or a remote storage location such as a web service. The proof file destination is stored 38 in the print job database 26, completing 40 the submit print job routine 24.

After the print job has been submitted 24, the printer system computer 12 processes 42 the document. More specifically, a raster image processor in the digital front end (DFE) decomposes or RIPs the PDL file into a contone image, i.e., a byte map. A digital front end (DFE) is defined hereby as an integrated print workflow management system capable of receiving and processing print requests and controlling the operation of a digital marking system (printer) to fulfill the print request. Print requests are defined by 1) a request to print content and 2) processing instructions. The content is typically a page description language (PDL) file or data stream. The processing instructions may be embedded in the content, provided separately, or acquired indirectly by associating a print request with a method of reusing existing processing instructions (queue programming). The processing instructions may be explicit or implicit, describing the desired intent of the resulting printed material. The DFE converts print device independent content and format into print device dependent content that is directly consumable by the digital marking device in fixed time windows. The DFE manages the digital marking system and delivers the print device dependent content. Minimal processing provided by a DFE includes: a PDL or data stream decomposer, an imager or raster input processor (RIP), and an interface for controlling the digital marking system. Additional processing typically provided includes network communication gateways, imposition, local repositories for job storage, and job and printer management controls.

The printer system computer 12 saves 44 the post-RIP file, which is a ready-to-print file, in the printer system computer memory. An example of such file format is the Fast Reprint Format (FRF) utilized in Xerox DocuSP color digital front end, which relies on pages compressed in Xerox Multi Mode compression. Proofing post RIP on a production class printing devices provides several benefits. The digital front end of such devices typically provides an extensive list of color and image quality modification features. These features may be programmed manually at the DFE's graphical user interface, remotely using job submission software, and by programming accelerators such as queue or virtual printer programming. The accelerators apply consistent feature settings to all print jobs submitted to the queue or virtual printer. While this has obvious advantages, it can result in unexpected results if the job submitter is not aware of the programming of the queue or virtual printer. All of the feature selections are captured in the post-RIP job, hence using post-RIP pages provide a more accurate representation of the production print.

The printer system computer 12 then determines 46 whether the version of the file saved in memory is suitable as a proofing file format. Such a format is portable and complete, including all resources (fonts, images, forms, etc.) necessary for the proof. The format also includes a description of the color response of the targeted output device, i.e. an International Color Consortium color profile (or equivalent mechanism). One example of such a format is the PDF/X-1a file format, which requires all the resources necessary to present the content and includes an Output Intent description for the printer. Another suitable file format for individual pages is the TIFF/IT-P1 file format. If the saved version of the file has a suitable format 48, the printer system computer saves 50 a proofing file copy in the proofing file storage location designated in the print job database 26, converting the resolution of the post-RIP file to a predetermined value specified by the submitter in the print job database record if necessary, thereby making the proofing file available to the approvers. If the version of the file saved in the printer system computer memory does not have a suitable format 52, the printer system computer 12 creates 54 a copy of the post-RIP file in a remote proofing file format and saves 50 the proofing file in the proofing file storage location designated in the print job database 26.

The printer system computer 12 then sends an electronic message 56, typically by e-mail, informing each approver that the proofing file is available for review and providing information on how the proofing file may be accessed. If the proofing file is small enough, it may be attached to the notification e-mail rather than requiring the approver to access a remote storage location. It should be understood that file size limitations imposed by many Internet servers will preclude attaching larger proofing files to the notification e-mail.

It is the responsibility of each approver to access and review 58 the proofing file. Access to the proofing file storage area may require entry of a password or be controlled by other security requirements. If the monitor for their computer 16 is properly calibrated and characterized, the displayed document will have the same relative appearance as a printed proofing copy would have. An alternate means of reviewing the proofing file is to print a hard copy on a print device close to the approver. Generally, each approver may either disapprove, approve or conditionally approve/disapprove the proofing file by return electronic communication (e.g. via e-mail reply). The decision of each approver is stored 60 in the print job database 26 (see last column of FIG. 3).

The printer system computer 12 periodically queries the print job database 26 to determine the proof decision status of each proofing file. If the proof decision status field 62 for each approver associated with a given print job indicates that the approver has unconditionally approved 64 the proofing file, the printer system computer automatically releases the stored ready-to-print file to print 66.

In the event that the proof decision status field for each approver associated with a given print job does not indicate that the approver has unconditionally approved the proofing file 68, the printer system computer queries 70 a local policy section of the database 26 to determine the action required.

Local policy may require that all approvers unconditionally approve a proofing file before it can be released to print. Local policy may further require that all print jobs that are not so approved be deleted. In the event that the proof decision status field for one or more approver associated with a given print job indicates that the approver has unconditionally disapproved the proofing file 72, the printer system controller will delete the ready-to-print file from the printer system controller memory and delete the proofing file from the proof file storage location 74. Alternatively, local policy may require that the disapproved proofing file be retained 76 in memory permanently or for a period of time.

It is often difficult to ensure that all approvers proof a proofing file in a timely manner. Local policy may provide for classifying a print job as approved or disapproved if the proof decision status field 62 for one or more approver associated with a given print job remains empty (indicating that the approver has not proofed the proofing file) for a predetermined period of time after the proofing file has been made available. Specifically, local policy may require that the empty print decision status fields 62 be considered as containing "approved" if a timer query 78 by the printer system computer 12 indicates that the time period has expired, allowing the contents of the filled print decision status fields to determine the fate of the print job. For example, if all of the filled print decision status fields indicate that the responding approvers have unconditionally approved the proofing file 80, the printer system computer automatically releases the stored ready-to-print file to print 66. If the proof decision status field for one or more responding approver indicates that the approver has unconditionally disapproved the proofing file 82, the printer system controller will act in accordance to the local rules regarding such disapproval, as outlined above.

Generally, if the proof decision status field for one or more approver associated with a given print job indicates that the approver has conditionally approved/disapproved the proofing file, print job record in the print job database is examined to determine whether the document can be improved to comply with the conditions of the approval or be corrected to overcome the conditions of the disapproval. Documents so modified are resubmitted 84 for proofing.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of automatic proofing a document submitted for printing on a digital press having a digital front end, the method comprising:
a computer system of the digital front end
inputting the document into a raster image processor to produce a post-RIP file, and
storing persistent job status information relating to the document in a memory prior to approval of the proofing file;
saving a proofing file copy of the post-RIP file in a proofing file storage location;
transmitting a notification electronically to each approver that the proofing file is available for review;
monitoring a proof decision status of the proofing file, the proof decision status providing an indication of the response of each approver; and
automatically releasing the post-RIP file to print if the proof decision status indicates that the proofing file is approved.

2. The method of claim 1 wherein storing persistent job status information relating to the document in a memory comprises:
opening a print job database;
creating at least one document record associated with the document within the database;
querying for a listing of all approvers;
querying for approver information for each listed approver, including at least address information for electronic delivery of the notification; and
saving approver information in the at least one document record.

3. The method of claim 2 wherein the computer system of the digital front end further:
queries for a proof file destination; and
saves the proof file destination in the at least one document record.

4. The method of claim 1 further comprising saving the post-RIP file in a memory of the computer system of the digital front end.

5. The method of claim 1 further comprising the computer system of the digital front end:
determining whether the post-RIP file is suitable as a proofing file format; and
saving the post-RIP file in the proofing file storage location if the post-RIP file has a suitable format; or
creating a copy of the post-RIP file in a remote proofing file format; and
saving the copy in the proofing file storage location.

6. The method of claim 5 wherein the computer system of the digital front end further:
determines whether the post-RIP file has a resolution compatible with a predetermined value and
converts the resolution of the post-RIP file to the predetermined value while creating the copy of the post-RIP file in the remote proofing file format.

7. The method of claim 1 wherein the notification also provides information on how the proofing file may be accessed.

8. The method of claim 1 wherein the notification includes an attachment containing the proofing file.

9. The method of claim 2 further comprising the approver:
accessing the proofing file with an approver computer system;
transmitting a proof decision electronically to the computer system of the digital front end; and
the computer system of the digital front end saving the proof decision in a proof decision status field associated with the approver, of the at least one document record.

10. The method of claim 9 wherein the computer system of the digital front end periodically queries the proof decision status file associated with each approver of the document and:
releases the post-RIP file to print if the proof decision status field associated with each approver of the document indicates that the approver has approved the document; or
queries a local policy section of the database to determine the action required if the proof decision status field associated with each approver of the document does not indicate that the approver has approved the document.

11. The method of claim 10 wherein the computer system of the digital front end deletes the proofing file and post-RIP file if the proof decision status field associated with each approver of the document does not indicate that the approver has approved the document and the local policy requires that all documents that are not unconditionally approved by each approver be deleted.

12. The method of claim 10 wherein the computer system of the digital front end retains the proofing file and post-RIP file for a predetermined period of time if the proof decision status field associated with each approver of the document does not indicate that the approver has approved the document and the local policy requires that all documents that are not unconditionally approved by each approver be retained.

13. The method of claim 10 wherein the computer system of the digital front end:
queries a timer periodically if the proof decision status field associated with at least one approver of the document does not contain the proof decision and is empty;
saves an approval in each empty proof decision status field if the timer exceeds a predetermined time period; and
releases the post-RIP file to print if the proof decision status field associated with each approver of the document indicates that the document has been approved; or
deletes the proofing file and post-RIP file if the proof decision status field associated with each approver of the document does not indicate that the document has been approved and the local policy requires that all documents that are not unconditionally approved be deleted; or
retains the proofing file and post-RIP file for a predetermined period of time if the proof decision status field associated with each approver of the document does not indicate that the document has been approved and the local policy requires that all documents that are not unconditionally approved be retained.

14. The method of claim 10 wherein the computer system of the digital front end prompts the originator of the document to determine whether the document can be modified and resubmitted if the proof decision status field associated with at least one approver of the document contains a conditional approval or a conditional disapproval and no proof decision status field associated with any approver of the document contains an unconditional disapproval.

15. The method of claim 1 further comprising submitting the document in a print job ticket format.

16. The method of claim 15 wherein the print job ticket format is selected from the group comprising Print Instruction Format or Job Description Format.

17. The method of claim 1 further comprising submitting the document in Internet Print Protocol.

18. A method of automatic proofing a document comprising:

an originator submitting a document to be printed on a digital press having a digital front end;

a computer system of the digital front end inputting the document into a raster image processor to produce a post-RIP file;

the computer system of the digital front end saving the post-RIP file in a memory of the computer system of the digital front end;

the computer system of the digital front end determining whether the post-RIP file is suitable as a proofing file format and
 saving the post-RIP file in a proofing file storage location if the post-RIP file has a suitable format, or
 creating a copy of the post-RIP file in a remote proofing file format, and
 saving the copy in the proofing file storage location;

the computer system of the digital front end transmitting a notification electronically to each approver that the proofing file is available for review;

the approver
 accessing the proofing file with an approver computer system, and
 transmitting a proof decision electronically to the computer system of the digital front end;

the computer system of the digital front end saving the proof decision in a proof decision status field associated with the approver;

the computer system of the digital front end periodically queries the proof decision status file associated with each approver of the document; and the computer system of the digital front end automatically releasing the post-RIP file to print if the proof decision status field associated with each approver of the document indicates that the approver has unconditionally approved the document.

19. The method of claim 18 wherein the computer system of the digital front end queries a local policy section of the database to determine the action required if the proof decision status field associated with each approver of the document does not indicate that the approver has unconditionally approved the document.

20. The method of claim 19 wherein the computer system of the digital front end deletes the proofing file and post-RIP file saved in memory if the proof decision status field associated with each approver of the document does not indicate that the approver has approved the document and the local policy requires that all documents that are not unconditionally approved by each approver be deleted.

21. The method of claim 19 wherein the computer system of the digital front end retains the proofing file and post-RIP file stored in memory for a predetermined period of time if the proof decision status field associated with each approver of the document does not indicate that the approver has approved the document and the local policy requires that all documents that are not unconditionally approved by each approver be retained.

22. The method of claim 19 wherein the computer system of the digital front end:
 queries a timer periodically if the proof decision status field associated with at least one approver of the document does not contain the proof decision and is empty;
 saves an approval in each empty proof decision status field if the timer exceeds a predetermined time period; and
 releases the post-RIP file to print if the proof decision status field associated with each approver of the document indicates that the document has been approved; or
 deletes the proofing file and post-RIP file if the proof decision status field associated with each approver of the document does not indicate that the document has been approved and the local policy requires that all documents that are not unconditionally approved be deleted; or
 retains the proofing file and post-RIP file for a predetermined period of time if the proof decision status field associated with each approver of the document does not indicate that the document has been approved and the local policy requires that all documents that are not unconditionally approved be retained.

23. The method of claim 19 wherein the computer system of the digital front end prompts the originator of the document to determine whether the document can be modified and resubmitted if the proof decision status field associated with at least one approver of the document contains a conditional approval or a conditional disapproval and no proof decision status field associated with any approver of the document contains an unconditional disapproval.

* * * * *